(12) United States Patent
Willeke et al.

(10) Patent No.: US 9,841,113 B2
(45) Date of Patent: Dec. 12, 2017

(54) PRESSURE RELIEF VALVE FOR A HYDRAULIC SYSTEM

(75) Inventors: Roshan Willeke, Karlsruhe (DE); Andreas Birk, Oberkirch (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 2058 days.

(21) Appl. No.: 12/218,232

(22) Filed: Jul. 12, 2008

(65) Prior Publication Data

US 2009/0029813 A1    Jan. 29, 2009

Related U.S. Application Data

(60) Provisional application No. 60/961,260, filed on Jul. 18, 2007, provisional application No. 60/965,201, filed on Aug. 17, 2007.

(51) Int. Cl.

| | | |
|---|---|---|
| *F16H 59/00* | (2006.01) | |
| *F16H 61/00* | (2006.01) | |
| *F16H 63/00* | (2006.01) | |
| *F16K 17/34* | (2006.01) | |
| *F16K 15/00* | (2006.01) | |
| *F16K 17/00* | (2006.01) | |
| *F16K 21/04* | (2006.01) | |
| *F16K 17/04* | (2006.01) | |

(52) U.S. Cl.
CPC .................... *F16K 17/04* (2013.01)

(58) Field of Classification Search
CPC ..... F16H 2007/0806; F16H 2007/0812; F16H 2007/0859; F16H 2007/0814; Y10T 137/7929

USPC ......... 474/18, 110, 109; 137/12, 484.2, 490, 137/493, 494, 495, 540, 543.17, 516.11, 137/528, 535, 538

See application file for complete search history.

(56) References Cited

U.S. PATENT DOCUMENTS

| | | | | |
|---|---|---|---|---|
| 1,998,020 A | * | 4/1935 | Mezger | 417/303 |
| 2,244,212 A | * | 9/1941 | Patton | 137/491 |
| 2,368,367 A | * | 1/1945 | Lung | 417/80 |
| 2,392,213 A | * | 1/1946 | Cruzan | 137/115.01 |
| 2,392,214 A | * | 1/1946 | Cruzan | 137/115.01 |
| 2,406,973 A | * | 9/1946 | Trisler | 417/278 |
| 2,745,254 A | * | 5/1956 | Malkoff | 62/198 |
| 2,930,401 A | * | 3/1960 | Cowan | 137/540 |
| 3,563,137 A | * | 2/1971 | Graber et al. | 60/472 |
| 3,586,082 A | * | 6/1971 | Muller | 137/494 |

(Continued)

FOREIGN PATENT DOCUMENTS

| | | |
|---|---|---|
| DE | 40 39 600 A1 | 6/1992 |
| GB | 1 371 793 | 10/1974 |

(Continued)

*Primary Examiner* — Henry Liu
(74) *Attorney, Agent, or Firm* — LeKeisha M. Suggs

(57) ABSTRACT

A pressure relief valve for a hydraulic system for controlling a belt-driven conical-pulley transmission. The valve includes an orifice having an opening to admit a stream of a hydraulic medium, and a valve cone to block the opening in the orifice. A spring is carried by the valve cone to apply a restoring force to press the valve cone against the orifice in sealing contact with the opening. A hydraulic plate having a valve bore is provided to receive and guide the valve cone and the spring. A lateral force support is carried by the valve cone to align the axis of the valve cone relative to the axis of the orifice opening.

14 Claims, 3 Drawing Sheets

(56) References Cited

U.S. PATENT DOCUMENTS

| | | | |
|---|---|---|---|
| 3,626,977 A * | 12/1971 | Riley et al. | 137/516.25 |
| 3,633,763 A * | 1/1972 | Peterson | 213/43 |
| 3,704,634 A * | 12/1972 | Schrodt | 474/18 |
| 3,759,636 A * | 9/1973 | Schaefer et al. | 417/281 |
| 3,807,449 A * | 4/1974 | Van Dest | 137/596.14 |
| 3,911,950 A * | 10/1975 | Lowe et al. | 137/543.17 |
| 3,972,345 A * | 8/1976 | Court | 137/490 |
| 3,980,095 A * | 9/1976 | McAvoy | 137/115.1 |
| 4,135,541 A * | 1/1979 | Lorimor | 137/116.3 |
| 4,161,928 A * | 7/1979 | Teague et al. | 123/336 |
| 4,231,390 A * | 11/1980 | Teague | 137/315.05 |
| 4,591,314 A * | 5/1986 | Weber | 417/47 |
| 4,642,069 A * | 2/1987 | Sawada et al. | 474/28 |
| 4,790,347 A * | 12/1988 | Weirich et al. | 137/484.2 |
| 4,836,240 A * | 6/1989 | Elliott | 137/493 |
| 4,854,922 A * | 8/1989 | Hertrich et al. | 474/110 |
| 4,911,468 A * | 3/1990 | Fukunaga | 280/5.5 |
| 5,076,647 A * | 12/1991 | Grana et al. | 303/113.2 |
| 5,143,115 A * | 9/1992 | Geyler, Jr. | 137/493 |
| 5,174,327 A * | 12/1992 | Truax et al. | 137/469 |
| 5,282,677 A * | 2/1994 | Luetteke | 303/116.2 |
| 5,700,213 A * | 12/1997 | Simpson et al. | 474/110 |
| 5,707,309 A * | 1/1998 | Simpson | 474/110 |
| 5,829,560 A * | 11/1998 | Mainquist et al. | 192/3.57 |
| 5,879,256 A * | 3/1999 | Tada | 474/110 |
| 5,967,921 A * | 10/1999 | Simpson et al. | 474/110 |
| 6,117,033 A * | 9/2000 | Simpson | 474/110 |
| 6,119,962 A * | 9/2000 | Youakim et al. | 239/124 |
| 6,131,606 A * | 10/2000 | O'Neill | 137/495 |
| 6,322,468 B1* | 11/2001 | Wing et al. | 474/110 |
| 6,352,487 B1* | 3/2002 | Tada | 474/110 |
| 6,361,458 B1* | 3/2002 | Smith | 474/109 |
| 6,383,103 B1* | 5/2002 | Fujimoto et al. | 474/110 |
| 6,398,682 B1* | 6/2002 | Suzuki et al. | 474/110 |
| 6,592,479 B2* | 7/2003 | Nakakubo et al. | 474/109 |
| 6,938,873 B2* | 9/2005 | Fischer | 251/30.04 |
| 7,007,708 B2* | 3/2006 | Burke et al. | 137/12 |
| 7,070,528 B2* | 7/2006 | Emizu et al. | 474/110 |
| 7,125,230 B2* | 10/2006 | Davis et al. | 417/454 |
| 7,618,339 B2* | 11/2009 | Hashimoto et al. | 474/109 |
| 2001/0032675 A1* | 10/2001 | Russell | 137/493.9 |
| 2002/0052259 A1* | 5/2002 | Nakakubo et al. | 474/109 |
| 2003/0166428 A1* | 9/2003 | Beardmore | 474/110 |
| 2003/0195070 A1* | 10/2003 | Beardmore | 474/110 |
| 2005/0001190 A1* | 1/2005 | Shirase et al. | 251/129.15 |
| 2005/0081928 A1* | 4/2005 | Burke et al. | 137/601.18 |
| 2006/0063625 A1* | 3/2006 | Emizu et al. | 474/110 |

FOREIGN PATENT DOCUMENTS

| | | |
|---|---|---|
| JP | 04-266668 A | 9/1992 |
| JP | 10160015 A | 6/1998 |

* cited by examiner

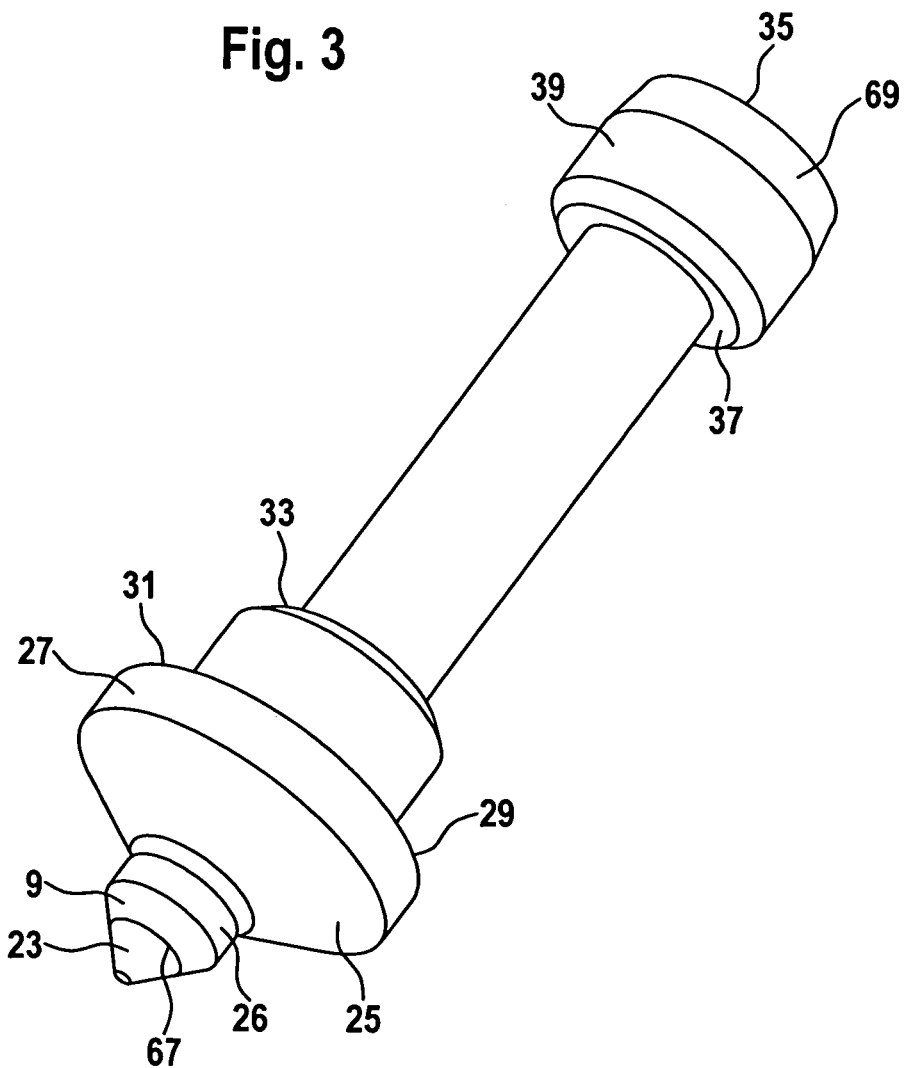

prior art).

PRESSURE RELIEF VALVE FOR A HYDRAULIC SYSTEM

BACKGROUND OF THE INVENTION

Field of the Invention

The invention relates to a pressure relief valve for a hydraulic system as well as a hydraulic system for controlling a belt-driven conical-pulley transmission (CVT). The invention also relates to a belt-driven conical-pulley transmission controlled thereby and to a motor vehicle equipped therewith.

Description of the Related Art

Belt-driven conical-pulley transmissions can have a continuously variable transmission ratio, in particular automatically occurring transmission ratio variation.

Such continuously variable transmissions include, for example, a start-up unit, a reversing planetary gearbox as the forward/reverse drive unit, a hydraulic pump, a variable speed drive unit, an intermediate shaft, and a differential. The variable speed drive unit includes two conical pulleys and an encircling element. Each conical pulley includes a first, axially fixed conical disk and a second, axially displaceable conical disk. An endless torque-transmitting means runs between the pairs of conical pulleys and can be, for example, a steel thrust belt, a traction chain, or a belt. By axially displacing the second conical disk relative to the first conical disk, the running radius of the endless torque-transmitting means changes, and hence so does the transmission ratio of the continuously variable automatic transmission.

Continuously variable automatic transmissions require a particular pressure level, sometimes high, in order to be able to move the conical disks of the variable speed drive unit with the desired speed at all operating points, and also to transmit the torque with sufficient basic pressing force largely without wear. The overall control can be provided by means of an electrical control system, which can include electrically operated proportional valves, for example.

An object of the present invention is to provide an improved pressure relief valve, in particular one that is less hysteresis-prone, simpler to produce, and/or more temperature stable.

SUMMARY OF THE INVENTION

The object is achieved with a pressure relief valve in accordance with the present invention for a hydraulic system, in particular for controlling a belt-driven conical-pulley transmission. The pressure relief valve has an apertured orifice to admit a stream of a hydraulic medium, a valve cone to block the orifice, a spring carried by the valve cone to press the valve cone with a restoring force against the orifice in a sealing contact, and a hydraulic plate to receive and guide the valve cone and the spring. Advantageously, a lateral force support is carried by the valve cone to align the angle of the valve cone axially relative to that of the orifice. Depending upon the operating condition of the pressure relief valve, and/or any manufacturing tolerances of the individual components of the pressure relief valve, an undesired misalignment of the valve cone relative to the orifice can occur, wherein the longitudinal axes of the orifice and of the valve cone are at an undesired slight angle relative to each other. Advantageously, those misalignments can be minimized by means of the lateral force support that is provided. Advantageously, that arrangement makes it possible to achieve a good tightness of seal, as well as positive hysteresis behavior of the check valve. Complicated and expensive production to reduce the tolerances is not necessary.

One exemplary embodiment of the pressure relief valve provides that the spring is in the form of a helical compression spring, and the lateral force support is situated in an inner cylinder defined by radially inner surfaces of the helical compression spring. Advantageously, for axial alignment the lateral force support can contact the inner surfaces of the helical compression spring.

Another exemplary embodiment of the pressure relief valve provides a first outlet opening and a second outlet opening to let the stream of hydraulic medium escape. Advantageously, the outlet openings can be designed for different temperature operating points of the pressure relief valve, so that at a low temperature level, for example, the hydraulic medium flows by preference through the one outlet opening, and at a high temperature level the flow is predominantly through the other outlet opening. Advantageously, backup pressure force that otherwise affects the hysteresis behavior negatively can be reduced for example. Advantageously, that results in a check valve that is more robust with respect to temperature variations.

Another exemplary embodiment of the pressure relief valve provides that the first outlet opening is situated adjacent to the valve cone. In immediate proximity to a sealing valve cone surface of the valve cone, the hydraulic medium can flow directly to the first outlet opening, while advantageously any flow forces that may impinge on the valve cone, in particular at low temperatures, can be reduced.

Another exemplary embodiment of the pressure relief valve provides that a main flow direction of the first outlet opening is at an angle to a main flow direction of the orifice. With the pressure relief valve in the open condition, the direction of the inflowing hydraulic medium can be diverted to the first outlet opening. At the same time, it is possible to guide the flow out of the pressure relief valve again in a direct manner, i.e., past the valve cone.

Another exemplary embodiment of the pressure relief valve provides that the second outlet opening is situated axially opposite the orifice. Advantageously, a second flow path running essential coaxially with the valve cone can form, extending from the orifice to the second outlet opening. Advantageously, minimal flow impulses and lateral forces pass from that stream to the valve cone. Advantageously, that flow path can be used preferably at a high temperature level, and supports the coaxial alignment of the valve cone.

Another exemplary embodiment of the pressure relief valve provides that the first outlet opening is situated between the orifice and the second outlet opening. A partial stream can be diverted by way of the first outlet opening from a stream flowing between the inlet and the second outlet opening.

Another exemplary embodiment of the pressure relief valve provides that the valve cone has an annular or collar-like radial projection. The stream, which flows substantially coaxially within the bore, can flow around the annular or collar-like projection.

Another exemplary embodiment of the pressure relief valve provides that the projection has or forms a spring stop to receive and support the spring with respect to the valve cone. Advantageously, spring forces can be transmitted to the valve cone through the spring stop of the projection.

Another exemplary embodiment of the pressure relief valve provides that an annular gap exists between the annular projection and the cylindrical valve bore of the hydraulic plate. The hydraulic plate can be a normal cast plate, for example. The valve bore can be formed in the hydraulic plate in a simple manner, and can serve to receive the components, i.e., the spring and the valve cone of the pressure relief valve. The annular gap can be coordinated with the substantially coaxial flow to the second outlet opening.

Advantageously, the annular gap can act like a throttle, it being possible by means of the dimensioning of the annular gap to advantageously set a flow ratio, in particular a temperature-dependent flow ratio, between the first and the second outlet openings.

Another exemplary embodiment of the pressure relief valve provides that an intermediate plate associated with the hydraulic plate includes the orifice. The intermediate plate can be manufactured in a simple manner, for example as a stamped part, and can be joined to the hydraulic plate, for example through normal fixing means such as screw connections, rivets, bonding, and/or similar joining means.

Another exemplary embodiment of the pressure relief valve provides that the intermediate plate extends over one end of the valve bore. The intermediate plate can advantageously form a part of a housing of the pressure relief valve. The other part of the housing can be formed by the hydraulic plate with the valve bore.

Another exemplary embodiment of the pressure relief valve provides that the valve bore is formed as a stepped, throughbore. Advantageously, the step of the throughbore, having a smaller diameter than that of the valve bore, can be provided at the end of the valve bore located opposite the intermediate plate. Advantageously, an end of the helical compression spring can be supported on the step and can transmit the spring force to the annular projection of the valve cone. In addition, the throughbore serves as a fluid path and provides the second outlet opening.

The object is also achieved with a hydraulic system of a motor vehicle for controlling a belt-driven conical-pulley transmission having a variably adjustable transmission ratio, and including a pressure relief valve as described previously. The benefits described previously result.

The object is also achieved with a belt-driven conical-pulley transmission having the previously described hydraulic system. The benefits described previously result.

The object is also achieved with a motor vehicle having the previously described belt-driven conical-pulley transmission. The benefits described previously result.

BRIEF DESCRIPTION OF THE DRAWINGS

The structure, operation, and advantages of the present invention will become further apparent upon consideration of the following description, taken in conjunction with the accompanying drawings in which:

FIG. 3 is a perspective view of a valve cone of the pressure relief valve shown in FIGS. 1 and 2.

DESCRIPTION OF THE PREFERRED EMBODIMENTS

Figure 1:
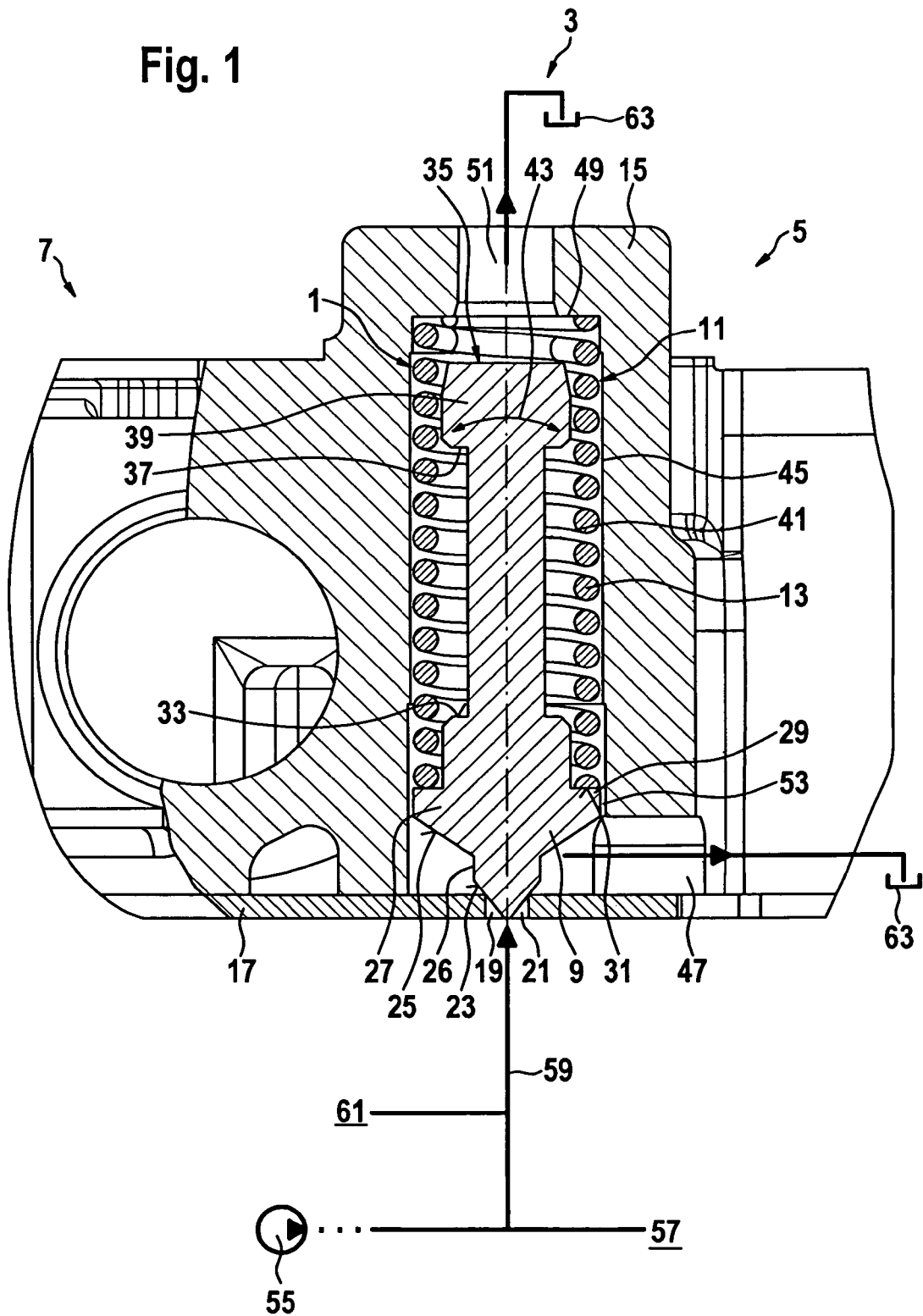
FIG. 1 is a hydraulic circuit diagram of a hydraulic system for controlling a belt-driven conical-pulley transmission, showing a longitudinal cross section of an embodiment of a pressure relief valve in accordance with the present invention.

FIG. 1 shows a pressure relief valve 1 as part of a hydraulic circuit diagram of a hydraulic system 3 for controlling a belt-driven conical-pulley transmission 5 of a motor vehicle 7. Pressure relief valve 1 includes a valve cone 9, a spring 11 in the form of a helical compression spring 13, a hydraulic plate 15, and an intermediate plate 17 fixed to the hydraulic plate 15. Hydraulic plate 15 can be a normal cast plate, provided with hydraulic functions. Intermediate plate 17 can be produced as a stamped part, and has an orifice 19 that defines an inlet 21 of the pressure relief valve 1. Inlet 21 can be closed by the valve cone 9. To press valve cone 9 against the orifice or to seal the orifice 19, spring 11 is supported by hydraulic plate 15 on one end and by valve cone 9 on the opposite end, so that a restoring force acting in a downward direction, as viewed in the orientation of FIG. 1, is exerted on valve cone 9. Valve cone 9 includes a first conical surface 23, which can be placed in sealing contact with inlet 21 of orifice 19 by means of the restoring force of spring 11.

Axially adjacent to first conical surface 23, which defines a sealing surface, valve cone 9 expands outwardly along a second conical surface 25 to terminate at a circumferential projection 27, that includes a radially-inwardly-extending wall that defines a first step 29, wherein first step 29 forms a stop surface 31 for helical compression spring 13 of spring 11. Conical surfaces 23 and 25 have different angles of taper. The angle of taper of first conical surface 23 is preferably between 70° and 100°. First conical surface 23 and second conical surface 25 are connected with each other by a first cylindrical intermediate section 26.

The stop surface 31 enables the force of helical compression spring 13 to be exerted on valve cone 9. At a second step 33, spaced axially from and lying above first step 29, as viewed in the orientation of FIG. 1, the width of valve cone 9 recedes to another smaller diameter. Second step 33 can be designed in any way desired. For example, it can be branched as an installation aid for helical compression spring 13. Below an upper end 35 of valve cone 9 a third step 37 is provided. Above third step 37, or between the upper end 35 and third step 37, the diameter of valve cone 9 is enlarged to form a lateral force support 39. Aside from bevels and the conical surfaces 23 and 25, valve cone 9 has a cylindrical form with steps, and with different diameters. Valve cone 9 can be manufactured as a turned part.

In the region between the stop surface 31 of the first step 29 and the lateral force support 39 located at the upper end 35, valve cone 9 is situated inside an inner cylinder 41 of helical compression spring 13. Advantageously, lateral force support 39 can contact helical compression spring 13 and align itself to a limited extent within the helical compression spring, as indicated by a double headed arrow 43 in FIG. 1. Larger tilt angles of valve cone 9 are not possible because of lateral force support 39, so that lateral force support 39 limits an angular misalignment of valve cone 9 relative to the longitudinal direction of a centerline of cylindrical bore 45 of hydraulic plate 15.

The sealing contact between orifice 19 and first conical surface 23 can be improved. Advantageously, lateral force support 39 and first conical surface 23 are spaced from each other in the longitudinal direction. In addition, a space can remain between inner cylinder 41 and lateral force support 39. Advantageously, valve cone 9 can align itself coaxially with a central longitudinal axis of orifice 19 within the bounds of the existing space without twisting. Because of the longitudinal distance between conical surface 23 and lateral force support 39, even under unfavorable flow conditions only slight angular axial misalignments occur, because they are limited by the lateral force support 39 contacting the inner cylinder 41 of helical compression spring 13. The longer the distance chosen, the more closely the angular coaxial misalignments are limited.

Adjacent to orifice 19, cylindrical bore 45 of hydraulic plate 15 has a first outlet opening 47. Cylindrical bore 45 is executed as a stepped, throughbore, and has at its upper end, as viewed in the orientation of FIG. 1, i.e., opposite orifice 19, a bore step 49 that reduces the bore diameter, which defines a second outlet opening 51 of pressure relief valve 1. Between the circumferential projection 27 of valve cone 9 and the cylindrical bore 45 an annular gap 53 remains.

Pressure relief valve 1 can be connected downstream from a hydraulic energy source 55 in a parallel branch or a branch line 59. The hydraulic energy source 55 can be designed to supply hydraulic components, which are indicated in FIG. 1 by means of reference label 57. The hydraulic components can be additional valve systems, for example for selecting gear ranges of the belt-driven conical-pulley transmission, for engaging or releasing a parking lock of the belt-driven conical-pulley transmission, for setting a transmission ratio of the belt-driven conical-pulley transmission, for setting or maintaining a clamping pressure of the belt-driven conical-pulley transmission, and/or other hydraulic components.

Pressure relief valve 1 can be associated with the orifice 19 of pressure relief valve 1 by way of branch line 59 in such a way that when an opening pressure is exceeded, valve cone 9 moves upward against the restoring force of spring 11, i.e., so that orifice 19 is opened for flowing hydraulic medium. That can lead to a desired pressure drop in branch line 59. In addition, a pressure recirculation line indicated by means of reference numeral 61 of a volume flow regulating valve can be connected to branch line 59. In addition, in the event of pressure relief valve 1 being opened, the pressure recirculation to a volume flow regulating valve through pressure recirculation line 61 can limit the flow volume from the hydraulic energy source 55 to the hydraulic components 57, and thus counteract an excess pressure.

Figure 2:
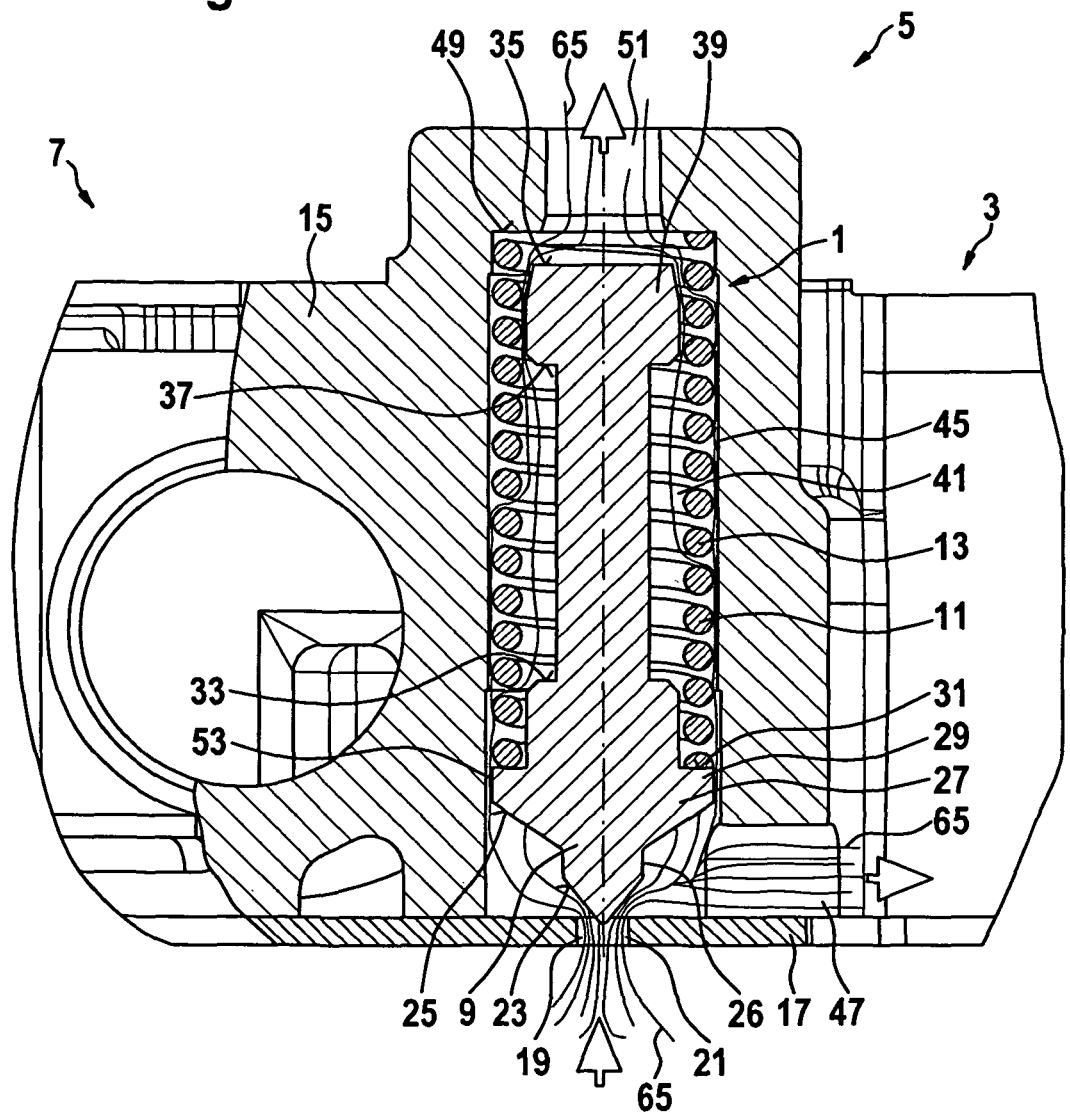
FIG. 2 is a longitudinal cross-sectional view of the pressure relief valve of FIG. 1 showing flow paths through the valve.

First outlet opening 47 and second outlet opening 51 are each connected downstream to a tank 63 of hydraulic system 3 of belt-driven conical-pulley transmission 5. FIG. 2 shows the pressure relief valve 1 of FIG. 1, with flow paths 65 illustrated. In addition, the pressure relief valve 1 shown in FIG. 2 is shown in the open state, where valve cone 9 is elevated so that the orifice 19 is open. It is apparent that the flow paths 65 divide, with a first part of the inlet flow 65 being diverted through orifice 19 toward the right, as viewed in the orientation of FIG. 1, to first outlet opening 47. The remaining flow volume flows substantially coaxially to the orientation of cylindrical bore 45, or of valve cone 9, through annular gap 53, along the inner cylinder 41 of helical compression spring 13, past lateral force support 39, and finally through second outlet opening 51.

FIG. 3 shows the valve cone 9 of the pressure relief valve 1 shown in FIGS. 1 and 2 in a bottom perspective view. First conical surface 23 is visible, with an annular sealing region 67 shown and which can be in sealing contact with the opening in orifice 19. It can also be seen that lateral force support 39 includes a chamfer 69 at an upper end of valve cone 9. Chamfer 69 can serve as an assembly aid for introducing the upper part of valve cone 9 into the inner cylinder 41 of helical compression spring 13.

Advantageously, pressure relief valve 1 has reduced hysteresis. Pressure relief valve 1 can be designed for a working range of 105 bar. Advantageously, pressure relief valve 1 is integrated into hydraulic plate 15. An additional sleeve is not necessary.

Advantageously, manufacturing tolerances that arise in the hydraulic plate 15 and the intermediate plate 17, as well as the valve cone 9, can be balanced out, in particular by means of the lateral force support 39. Pressure relief valve 1 includes an assembly of valve cone 9, spring 11, hydraulic plate 15, and intermediate plate 17. Advantageously, relatively large axial deviations of the inclination of the axis of valve cone 9 can nevertheless be compensated for. Moreover, advantageously any oblique positions that arise due to lateral forces and/or geometric imprecisions can be prevented and/or compensated for. Advantageously, to that end an angle of the first conical surface 23 can be coordinated with orifice 19 in such a way that a tolerance compensation results automatically. Furthermore, excessive angular axial deviations can be avoided by means of the lateral force support 39.

Pressure relief valve 1 can be designed for four relevant operating points, namely in the open state as shown in FIG. 2, in the closed state as shown in FIG. 1, and at high and low temperatures in each state.

At low temperatures, a hydraulic medium delivered by means of the hydraulic energy source 55 has a relatively high viscosity. After pressure relief valve 1 is opened, a comparatively high back pressure develops due to a throttling effect in the interior of the valve, i.e., within the cylindrical bore 45, which can be dissipated advantageously through first outlet opening 47. So despite the comparatively high viscosity of the hydraulic medium, pressure relief valve 1 can close again advantageously at the right time by means of the restoring force of helical compression spring 13.

The rapid pressure drop through first outlet opening 47 improves the closing behavior of the pressure relief valve, with little hysteresis resulting at the point of closure.

At high temperatures the hydraulic medium reaches a high flow velocity, because of comparatively low viscosity. At such high flow velocities the stream diverted to first outlet opening 47 produces a comparatively large impulse force on valve cone 9, in particular on conical surfaces 23 and 25. As that occurs a lateral force can develop, which presses valve cone 9 toward a wall of cylindrical bore 45. The closure point of the pressure relief valve can shift toward low pressures as a result. In principle, that can result in greater hysteresis at warm temperatures. Advantageously, that influence can be minimized by means of second outlet opening 51. At low temperatures only very little of the hydraulic medium flows through second outlet opening 51. At high temperatures the flow tends more to divide into a first stream to first outlet opening 47 and a second stream to second outlet opening 51. Advantageously, and as a result, pressure relief valve 1 or the position of the valve cone 9 can be stabilized over orifice 19, while advantageously the lateral impulse force is reduced correspondingly.

Flow cross sections and/or flow resistances of first outlet opening 47 and second outlet opening 51 can be coordinated with each other advantageously, so that at high temperatures only enough of the main stream is diverted to the second outlet opening 51, and so that only a comparatively small negative pressure, or none, forms at the first outlet opening 47. The negative pressure, which is avoidable in that way, would result in the valve cone 9 contacting the wall of cylindrical bore 45 or the inner cylinder 41 of helical compression spring 13, and thus would likewise result in an unfavorable influence on the hysteresis behavior.

The taper angle of first conical surface 23 can advantageously be between 70° and 100°, relative to the axis of valve cone 9. That angular range advantageously produces the self-adjustment of valve cone 9 relative to orifice 19 described earlier.

Pressure relief valve 1 can be integrated advantageously as a safety valve into a hydraulic control of hydraulic system 3, without the need of an additional housing. Advantageously, manufacturing tolerances of the four involved components (valve cone 9, helical compression spring 13, hydraulic plate 15, and intermediate plate 17) can be balanced out. Advantageously, good hysteresis behavior and good stability can be achieved by the arrangement of the components relative to each other, despite tolerances that can be present.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A pressure relief valve for a hydraulic system for controlling a belt-driven conical-pulley transmission, said valve comprising:
    a hydraulic plate having a valve bore for receiving a valve cone, the valve bore including a first end opening and a second end opening axially spaced from the first end opening;
    an orifice overlying the first end opening of the valve bore and defining an inlet opening to admit a stream of a hydraulic medium, the inlet opening having a central axis;
    a valve cone including a cylindrical body having an outer diameter smaller than an inner diameter of the valve bore for receiving flow of hydraulic fluid between the cylindrical body and the valve bore, the valve cone having a first end terminating in a first conical surface, the valve cone having a central axis and positioned within the valve bore and axially movable therewithin toward and away from the inlet opening to selectively open and block the inlet opening by the first conical surface, the valve bore including a first outlet opening positioned adjacent to and on a downstream side of the inlet opening defined by the orifice, and a second outlet opening defined by the second end opening of the valve bore;
    a compression coil spring carried by the valve cone to press the first conical surface against the orifice for sealing contact between the first conical surface and the orifice, the spring having a first end abutting a step carried by the valve cone and a second end spaced axially from the first end and abutting a bore stop formed in the hydraulic plate; and
    a lateral force support member extending radially outwardly of and carried by the valve cone at a second end of the valve cone that is spaced axially from the first end of the valve cone, wherein the lateral force support member serves for limiting axial misalignment of the valve cone relative to the longitudinal axis of the valve bore and for aligning the valve cone central axis substantially coaxially with the central axis of the inlet orifice by engagement of a radially outermost surface of the lateral force support member with an inner cylindrical surface that is defined by radially innermost surfaces of coils of the coil spring.

2. A pressure relief valve in accordance with claim 1, wherein the first outlet opening is laterally adjacent to a first conical surface of the valve cone.

3. A pressure relief valve in accordance with claim 1, wherein a flow direction of fluid flow through the first outlet opening is transverse to a flow direction of fluid flow through the orifice.

4. A pressure relief valve in accordance with claim 1, wherein the second outlet opening is axially opposite to and spaced from the orifice.

5. A pressure relief valve in accordance with claim 1, wherein the valve cone carries a radially outwardly extending circumferential projection adjacent to the valve cone first end.

6. A pressure relief valve in accordance with claim 5, wherein the circumferential projection defines a first spring stop surface to receive and support the first end of the spring.

7. A pressure relief valve in accordance with claim 5, wherein a radially outermost surface of the annular projection is spaced from an inner surface of the valve bore of the hydraulic plate to define a substantially annular gap therebetween.

8. A pressure relief valve in accordance with claim 1, wherein the orifice is provided in an intermediate plate carried by the hydraulic plate.

9. A pressure relief valve in accordance with claim 8, wherein the intermediate plate extends over the first end opening of the valve bore.

10. A pressure relief valve in accordance with claim 6, wherein the valve bore includes an inwardly extending step adjacent to the second end outlet opening to define a second spring stop for receiving and supporting a second end of the spring.

11. A hydraulic system for controlling a transmission of a motor vehicle, the transmission having a variably adjustable transmission ratio, the hydraulic system containing a pressure relief valve in accordance with claim 1.

12. A transmission having a hydraulic system in accordance with claim 11.

13. A motor vehicle having a transmission in accordance with claim 12.

14. A pressure relief valve in accordance with claim 1, wherein the hydraulic plate is a cast plate.

* * * * *